(12) United States Patent
Lee

(10) Patent No.: US 12,018,781 B1
(45) Date of Patent: Jun. 25, 2024

(54) PIPE REINFORCING CAP FOR SAFETY BELT WITH ENHANCED STIFFENING FORCE

(71) Applicant: Ho Lee, Changwon-si (KR)

(72) Inventor: Ho Lee, Changwon-si (KR)

( * ) Notice: Subject to any disclaimer, the term of this patent is extended or adjusted under 35 U.S.C. 154(b) by 0 days.

(21) Appl. No.: 18/530,005

(22) Filed: Dec. 5, 2023

(30) Foreign Application Priority Data

May 4, 2023 (KR) .......................... 10-2023-0058162

(51) Int. Cl.
*F16L 57/00* (2006.01)
*F16L 3/10* (2006.01)

(52) U.S. Cl.
CPC ........... *F16L 3/1033* (2013.01); *F16L 57/005* (2013.01)

(58) Field of Classification Search
CPC ............................... F16L 55/005; B65D 59/06
USPC ....................... 138/96 R, 96 T, 89, 89.1–89.4
See application file for complete search history.

(56) References Cited

U.S. PATENT DOCUMENTS

| | | | | |
|---|---|---|---|---|
| 1,498,563 | A | * | 6/1924 | Morrison ............... E21B 17/006 138/96 R |
| 4,157,100 | A | * | 6/1979 | Turk ...................... F16L 57/005 138/96 T |
| 4,777,985 | A | * | 10/1988 | Arduini .................. B65D 59/08 138/96 R |
| 6,796,333 | B2 | * | 9/2004 | Birkel .................... B65D 85/66 138/109 |
| 2010/0089484 | A1 | * | 4/2010 | Courtois ............... F16L 57/005 138/96 T |

FOREIGN PATENT DOCUMENTS

| | | |
|---|---|---|
| JP | 2012-030774 A | 2/2012 |
| KR | 20-0394646 A | 9/2005 |
| KR | 10-2515136 B | 3/2023 |

* cited by examiner

*Primary Examiner* — Patrick F Brinson
(74) *Attorney, Agent, or Firm* — PARK LAW FIRM

(57) ABSTRACT

The present invention relates to a reinforcing cap for enhancing the stiffening force of a pipe used in a safety belt, and more specifically, to a reinforcing cap for preventing a pipe from being damaged due to the explosion of an explosive device accommodated in the pipe, or for preventing explosive force of the explosive device accommodated in the pipe from being transferred to anything other than an actuating ball accommodated in the pipe due to the explosive device being expelled from the pipe by a closing operation of the pipe, and especially, to a reinforcing cap for a safety belt with enhanced stiffening force, which is fixed at a position past an expanded portion of the pipe, which is relatively low in stiffening force, thereby preventing the expanded portion from being damaged due to the explosive force of an explosion.

2 Claims, 6 Drawing Sheets

PIPE REINFORCING CAP FOR SAFETY BELT WITH ENHANCED STIFFENING FORCE

BACKGROUND OF THE INVENTION

Field of the Invention

The present invention relates to a reinforcing cap for enhancing the stiffening force of a pipe used in a safety belt, and more specifically, to a reinforcing cap for preventing a pipe from being damaged due to the explosion of an explosive device accommodated in the pipe, or for preventing explosive force of the explosive device accommodated in the pipe from being transferred to anything other than an actuating ball accommodated in the pipe due to the explosive device being expelled from the pipe by a closing operation of the pipe, and especially, to a pipe reinforcing cap for a safety belt with enhanced stiffening force, which is fixed at a position past an expanded portion of the pipe, which is relatively low in stiffening force, thereby preventing the expanded portion from being damaged due to the explosive force of an explosion.

Background Art

In general, safety belts used in a vehicle primarily consist of a 3-point safety belt system comprising a waist belt that wraps around the waist of a passenger and a shoulder belt that wraps around the shoulder and chest area of the passenger. A guide pulley is combined with the shoulder belt, a retractor for unwinding or winding a belt is installed in the center pillar portion of the vehicle, and the waist belt is typically mounted on a rocker panel.

The retractor is used to prevent the safety belt from rapidly loosening when a sudden impact occurs, and as illustrated in FIGS. 1 and 2, includes a housing 30 which is fixed to the seat of the vehicle, a guide drum 31 which is accommodated in the housing 30 and onto which the belt is wound, a pinion gear 32 for rotating the guide drum 31, a pipe (P) for driving the pinion gear 32, a cover 34 which is fastened to the housing 30, an explosive device 35 which is accommodated in the pipe (P) and fixed by a closing operation, and an actuating ball (B) which is accommodated in the pipe (P) that moves along the pipe (P) due to the explosion of the explosive device 35 to rotate the pinion gear 32. The pipe (P) is fixed by being forcedly fitted into a coupling hole formed in the cover 34 or fixed to a fixing plate 33 by pins or the like.

When a sudden impact occurs, the retractor propels the actuating ball (B) inside the pipe (P) towards the pinion gear 32 while the explosive device 35 containing gunpowder explodes, and the actuating ball (B) rapidly rotates the pinion gear 32 to wind up the safety belt, thereby protecting a passenger.

Meanwhile, in the case where an explosive device 35 housed within a pipe (P) detonates, the normal explosive force acts toward the multiple actuating balls (B) accommodated in the pipe (P), so that the actuating balls (B) moves rapidly toward the pinion gear 32. However, if the stiffening force of the pipe is deteriorated, the expanded portion (P1) of the pipe may be severed or damaged due to the explosion of the explosive device 35. Additionally, the portion of the pipe that has undergone a closing operation for fixing the explosive device may also be damaged. As a result, the explosive device of the explosion device may be expelled from the pipe, and the explosive force may be dissipated in directions other than toward the actuating balls (B). In such a case, the force exerted on the actuating balls (B) may decrease, such that the rotational force for turning the pinion gear 32 is deteriorated. Accordingly, when there is a car collision, the safety belt is not normally wound, and so, the passenger who is on the vehicle may be pose a risk of severe injury.

To address such issues, the present applicant has previously filed for Korean Patent No. 10-2426942, which discloses a pipe reinforcing cap for a safety belt.

In Korean Patent No. 10-2426942, the reinforcing cap 10 for reinforcing stiffening force of a pipe used for a safety belt includes a cylindrical circumferential portion 11, and bending portions 13 and 15 formed on both lateral cross-sections of the circumferential portion 11. The circumferential portion 11 is fixed to one end of the pipe (P) so as to envelop the outer circumferential surface of the pipe (P), a coupling protrusion 14 is formed at one side of the circumferential portion 11, and a coupling groove 16 to which the coupling protrusion 14 can be fit is formed on the circumferential portion 11 of the other side. When an external force is applied to reduce the outer diameter of the reinforcing cap 10, the coupling protrusion 14 fits into the securing hole 16, thereby fixing both sides of the circumferential portion 11. Even though the explosive device accommodated in the pipe exploded, the explosive force is transferred to the inside of the pipe and is used for the movement of the balls. However, since the lower bending portion 15 is fixed to the expanded portion (P1) of the pipe, at the time of explosion of the explosive device, the expanded portion (P1) which is relatively low in stiffening force may be damaged.

As another conventional art related to the reinforcing cap, the present applicant has previously filed for Korean Patent No. 10-2515136, which discloses a reinforcing structure of a pipe reinforcing cap for a safety belt.

In the reinforcing structure of a pipe reinforcing cap for a safety belt, includes a cylindrical circumferential portion 11, and bending portions 13 and 15 formed on both lateral cross-sections of the circumferential portion 11. The circumferential portion 11 is fixed to one end of the pipe (P) so as to envelop the outer circumferential surface of the pipe (P). Outside the reinforcing cap 10, a reinforcing capsule 20 surrounding the reinforcing cap 10 is fixed and coupled to the reinforcing cap 10, a fitting hole 17 is perforated on the circumferential surface of the reinforcing cap 10, and a fitting protrusion 21 is formed on the reinforcing capsule 20 to be inserted into the fitting hole 17. Although the reinforcing structure effectively prevents the explosive force of the explosive device from escaping out of the pipe, but at the time of explosion of the explosive device, the expanded portion (P1) which is relatively low in stiffening force may be damaged.

PATENT LITERATURE

Patent Documents

Patent Document 1: Korean Patent No. 10-2426942 (published on Jul. 28, 2022)
Patent Document 2: Korean Patent No. 10-2515136 (published on Mar. 27, 2023)

SUMMARY OF THE INVENTION

Accordingly, the present invention has been made to solve the above-mentioned problems occurring in the prior arts, and it is an object of the present invention to provide a reinforcing cap for preventing a pipe from being damaged due to the explosion of an explosive device accommodated in the pipe, or for preventing explosive force of the explosive device accommodated in the pipe from being transferred to anything other than an actuating ball accommodated in the pipe due to the explosive device being expelled from the pipe by a closing operation of the pipe, and especially, to a pipe reinforcing cap for a safety belt with enhanced stiffening force, which is fixed at a position past an expanded portion of the pipe, which is relatively low in stiffening force, thereby preventing the expanded portion from being damaged due to the explosive force of an explosion.

Another object of the invention is to provide a pipe reinforcing cap for a safety belt with enhanced stiffening force, which includes a cylindrical circumferential portion, a bending portion formed on one lateral cross-section of the circumferential portion, an extension portion integrally formed with the circumferential portion, and a coupling portion integrally formed with the extension portion, and can be manufactured using one iron plate, thereby simplifying the manufacturing process, reducing manufacturing costs, and facilitating easy installation.

A further object of the invention is to provide a pipe reinforcing cap for a safety belt with enhanced stiffening force, in which the extension portion extends to an inclined portion of the safety belt pipe, and the coupling portion is securely installed in a position past the inclined portion of the pipe, thereby preventing the explosive force from being directly transferred to the expanded portion of the pipe to prevent damage of the expanded portion.

To accomplish the above object, according to the present invention, there is provided a pipe reinforcing cap for reinforcing stiffening force of a pipe used in a safety belt, including a cylindrical circumferential portion, a bending portion formed on one lateral cross-section of the circumferential portion, an extension portion integrally formed with the circumferential portion, and a coupling portion integrally formed with the extension portion.

The pipe reinforcing cap for a safety belt with enhanced stiffening force is a reinforcing cap for preventing a pipe from being damaged due to the explosion of an explosive device accommodated in the pipe, or for preventing explosive force of the explosive device accommodated in the pipe from being transferred to anything other than an actuating ball accommodated in the pipe due to the explosive device being expelled from the pipe by a closing operation of the pipe, and especially, is fixed at a position past an expanded portion of the pipe, which is relatively low in stiffening force, thereby preventing the expanded portion from being damaged due to the explosive force of an explosion. The reinforcing cap includes a cylindrical circumferential portion, a bending portion formed on one lateral cross-section of the circumferential portion, an extension portion integrally formed with the circumferential portion, and a coupling portion integrally formed with the extension portion, and can be manufactured using one iron plate, thereby simplifying the manufacturing process, reducing manufacturing costs, and facilitating easy installation. In addition, the extension portion extends to an inclined portion of the safety belt pipe, and the coupling portion is securely installed in a position past the inclined portion of the pipe, thereby preventing the explosive force from being directly transferred to the expanded portion of the pipe to prevent damage of the expanded portion.

DETAILED DESCRIPTION OF THE PREFERRED EMBODIMENT

The present invention relates to a reinforcing cap for enhancing the stiffening force of a pipe used in a safety belt, and more specifically, to a reinforcing cap for preventing a pipe from being damaged due to the explosion of an explosive device accommodated in the pipe, or for preventing explosive force of the explosive device accommodated in the pipe from being transferred to anything other than an actuating ball accommodated in the pipe due to the explosive device being expelled from the pipe by a closing operation of the pipe, and especially, to a pipe reinforcing cap for a safety belt with enhanced stiffening force, which is fixed at a position past an expanded portion of the pipe, which is relatively low in stiffening force, thereby preventing the expanded portion from being damaged due to the explosive force of an explosion.

Hereinafter, preferred embodiments of the present invention will be described in detail with reference to the attached drawings.

Figure 1:
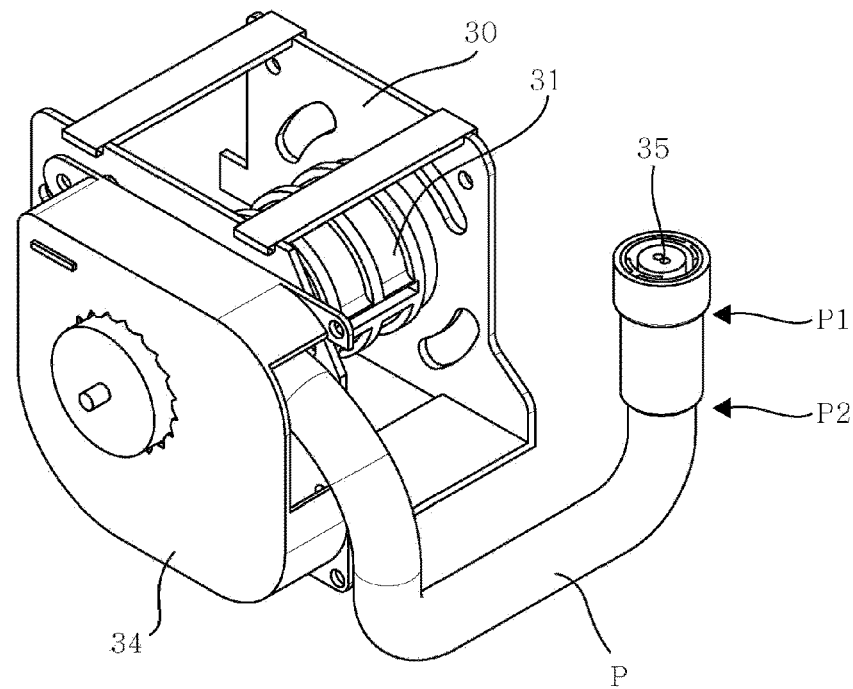
FIG. 1 is a schematic diagram of the configuration of a retractor for a safety belt.
Figure 2:
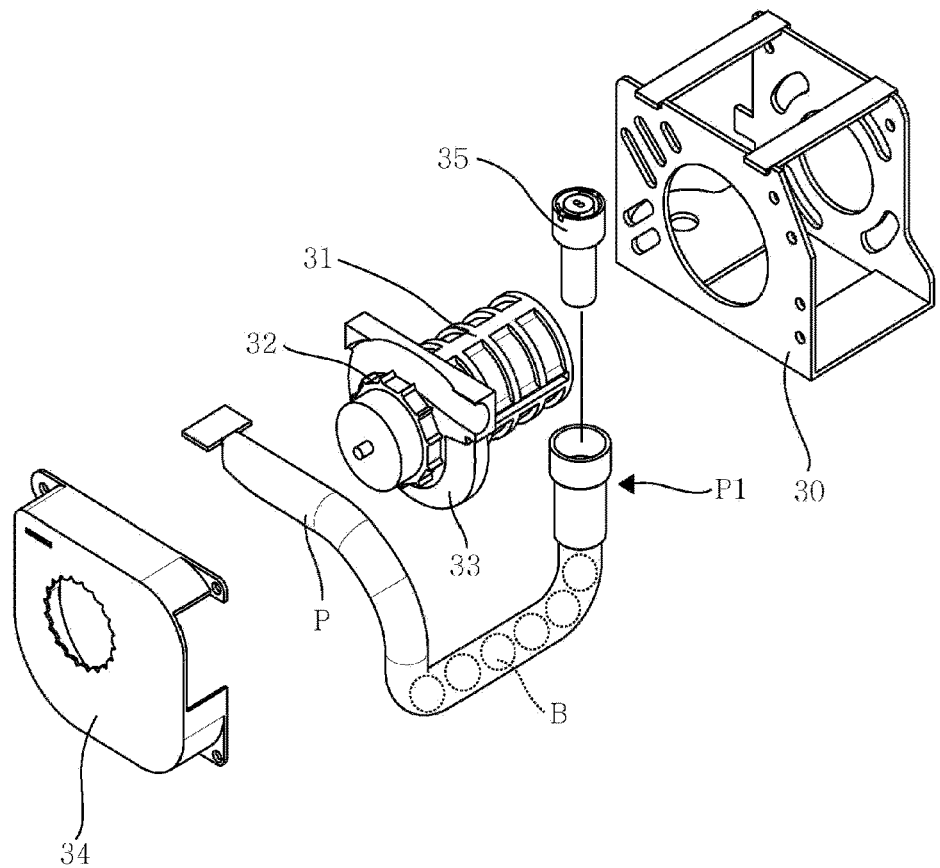
FIG. 2 is an exploded view of the retractor for the safety belt.
Figure 3:
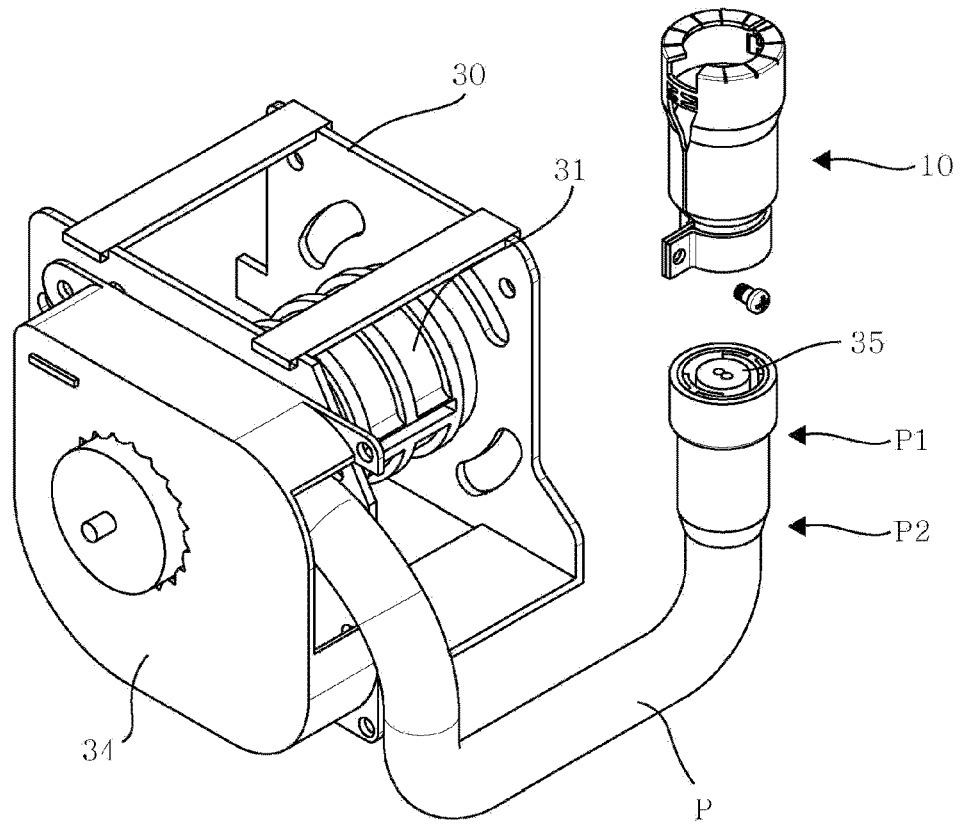
FIGS. 3 and 4 are exemplary views of a used state of the present invention.
Figure 4:
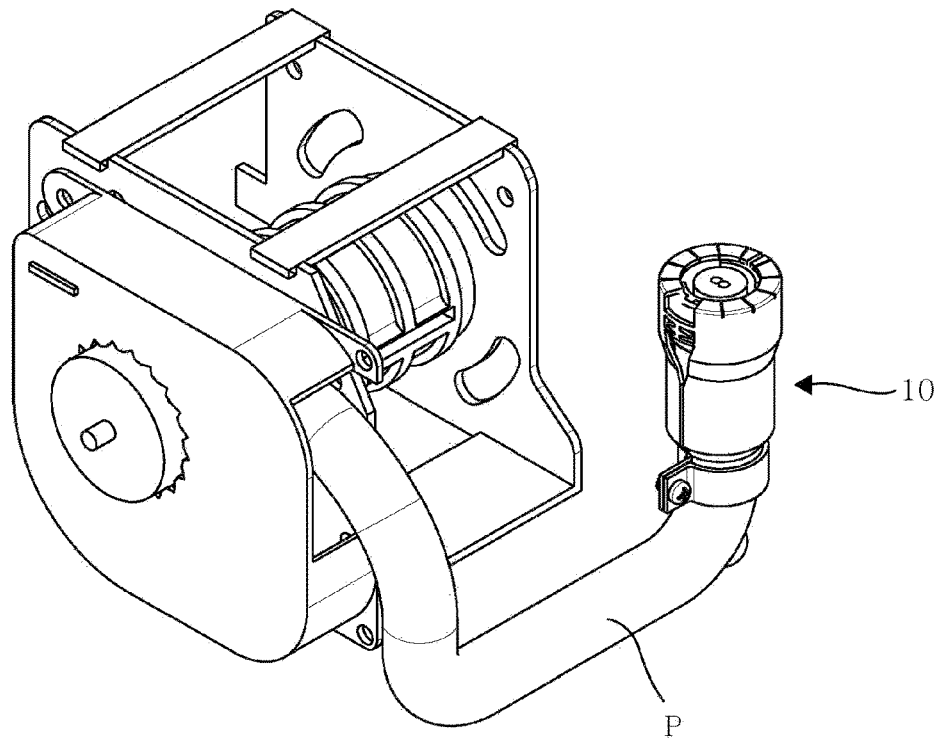

FIGS. 3 and 4 are exemplary views of a used state of the present invention. The reinforcing cap 10 for a safety belt pipe according to the present invention is installed on the outer circumferential surface of one side of a pipe (P) to prevent that the pipe (P) used in a retractor of the safety belt is damaged by explosion of an explosive device 35, and as illustrated in FIG. 4, an upper bending portion is in close contact with a cross section of the pipe, and a coupling portion is installed past an expanded portion and an inclined portion of the pipe.

Figure 5:
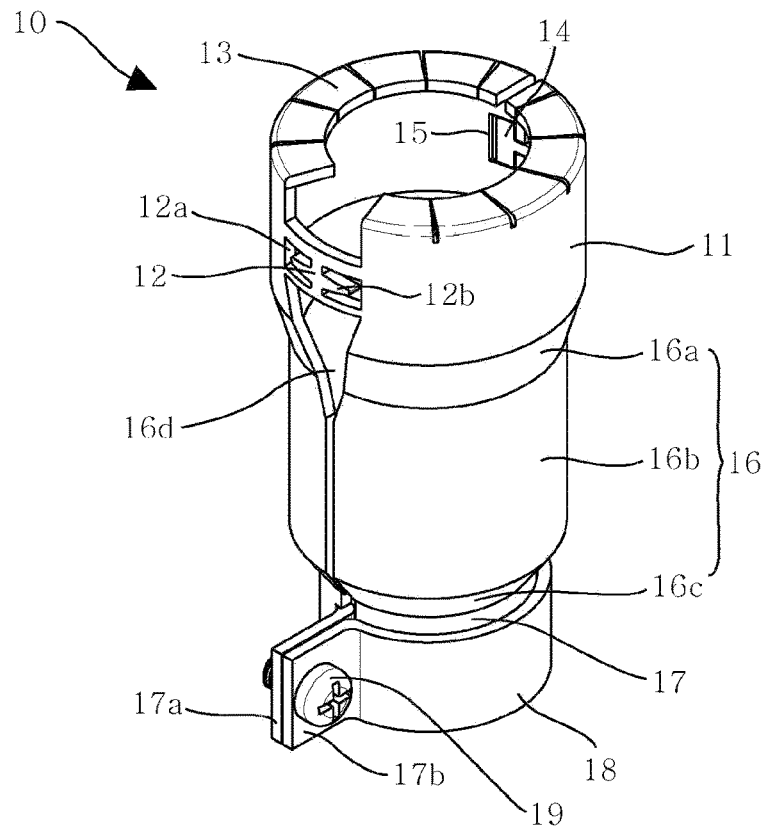
FIG. 5 is a perspective view of a reinforcing cap according to the present invention.
Figure 6:
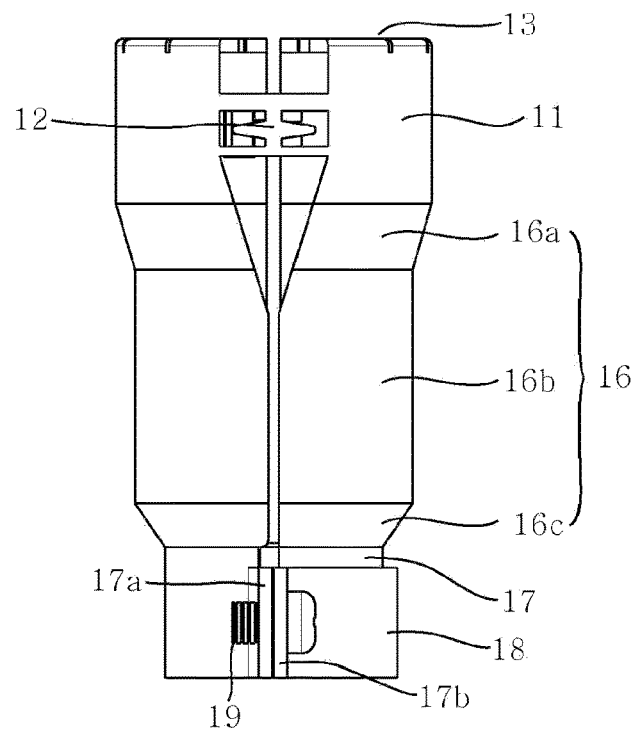
FIG. 6 is a front view of the reinforcing cap according to the present invention.
Figure 7:
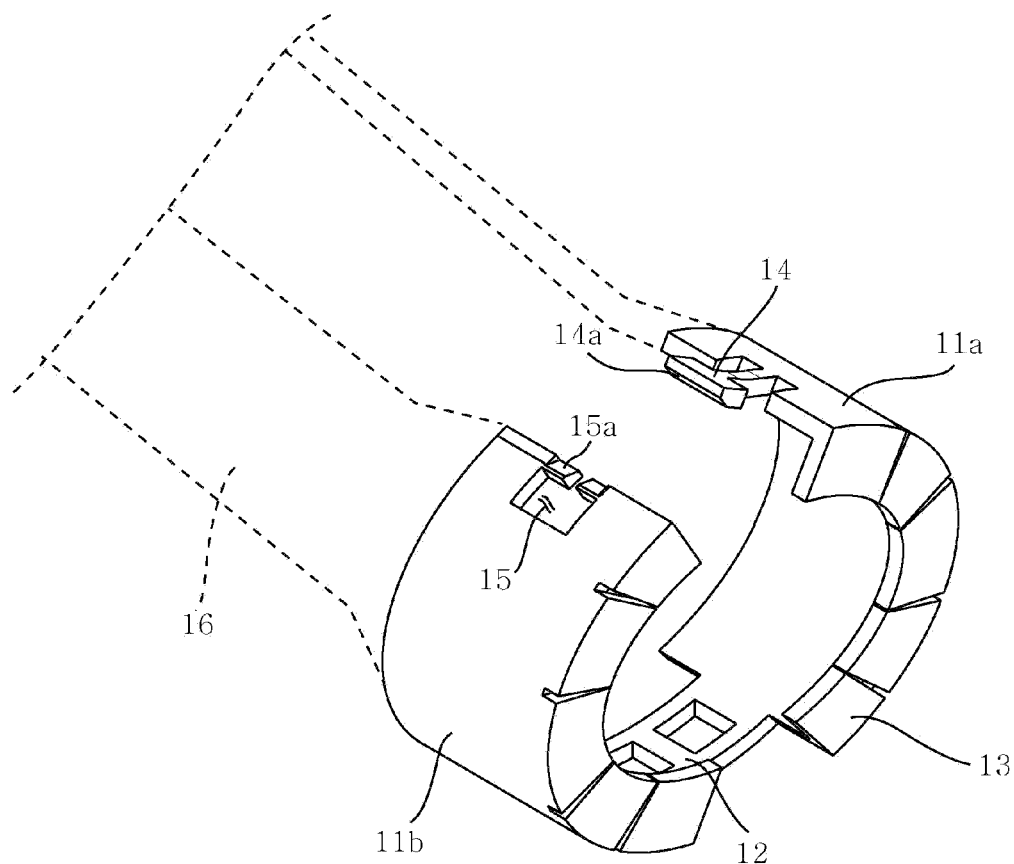
FIG. 7 is a view illustrating a partial configuration of the reinforcing cap according to the present invention.
Figure 8:
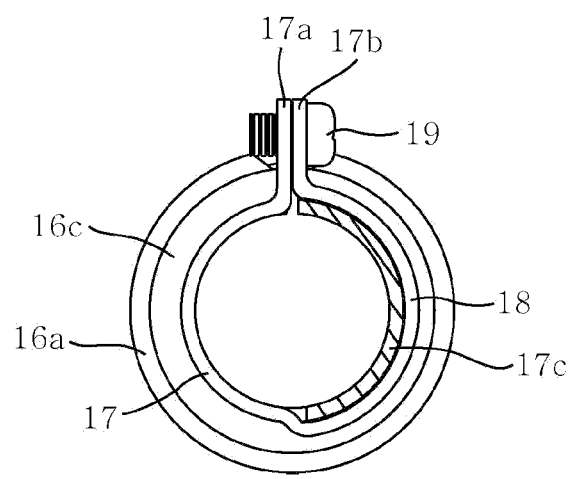
FIG. 8 is a bottom view of the reinforcing cap according to the present invention.

FIG. 5 is a perspective view of a reinforcing cap according to the present invention, FIG. 6 is a front view of the reinforcing cap according to the present invention, FIG. 7 is a view illustrating a partial configuration of the reinforcing cap according to the present invention, and FIG. 8 is a bottom view of the reinforcing cap according to the present invention. The reinforcing cap for a safety belt with enhanced stiffening force, which is a reinforcing cap for reinforcing stiffening force of a pipe used in a safety belt, includes a cylindrical circumferential portion, a bending portion formed on one lateral cross-section of the circumferential portion, an extension portion integrally formed with the circumferential portion, and a coupling portion integrally formed with the extension portion.

The circumferential portion 11 is cylindrical to accommodate the pipe (P), has an inner diameter which is equal to or a little larger than the outer diameter of the pipe (P), and is installed to be located at the explosive device 35 which is stored in the pipe (P). The bending portion 13 is formed on one side of the circumferential portion 11 and includes a plurality of grooves 13a to facilitate bending of the sheet metal. On the side opposite to the bending portion 13 of the circumferential portion 11, an extension portion 16 is integrally formed and extended, and the coupling portion 17 is integrally extended from the extension portion 16 to be in close contact with the pipe (P Furthermore, referring to FIG. 7, a coupling protrusion 14 is formed on one side of the circumferential portion 11 of the reinforcing cap 10, and a coupling groove 15 is formed on the opposite side of the circumferential portion 11 that can accommodate the coupling protrusion 14. When external force is applied in a direction to reduce the outer diameter of the reinforcing cap 10, the coupling protrusion 14 fits into the coupling groove 15, thereby fixing both sides of the circumferential portion 11.

That is, a convex-shaped coupling protrusion 14 is formed on one side of the circumferential portion 11 of the reinforcing cap 10, and a concave-shaped coupling groove 15 is formed on the circumferential portion 11 of the other side so that the coupling protrusion 14 is fit to the coupling groove 15. To fix the coupling protrusion 14 to the coupling groove 15, when an external force is applied in a direction to reduce the outer diameter of the reinforcing cap 10, namely, in a direction that the coupling protrusion 14 is moved toward the coupling groove 15, the coupling protrusion 14 enters the coupling groove 15 so that both sides of the circumferential portion 11 is completely fixed.

In other words, in a state where the coupling protrusion 14 is not inserted into the coupling groove 15, the circumferential portion 11 assumes an elliptical shape when viewed from the bending portion 13. When the coupling protrusion 14 is fully inserted into the coupling groove 15, the circumferential portion 11 assumes a circular shape with a constant curvature.

The circumferential portion 11 includes a protrusion circumferential portion 11a, where the coupling protrusion 14 is formed, and a groove circumferential portion 11b where the coupling groove 15 is formed. The connection portion 12 is formed to have a width smaller than the width of the protrusion circumferential portion 11a and the groove circumferential portion 11b. When an external force is applied in a direction to make the protrusion circumferential portion 11a and the groove circumferential portion 11b closer, the elliptical reinforcement cap 10 is changed into to cylindrical, and the circumferential portion 11 and connection portion 12 change their shapes, thereby allowing the coupling protrusion 14 to be inserted into the coupling groove 15.

In other words, at the center of the circumferential portion 11, the connection portion 12 with a width smaller than the width of the circumferential portion 11 is formed. Two through-holes 12a are formed in the connection portion 12, so when an external force is applied to the elliptical circumferential portion 11, it is easy to perform shape changes. The circumferential portion 11 includes the protrusion-circumferential portion 11a having the coupling protrusion 14 at one side, and the groove circumferential portion 11b having the coupling groove 15 at the other side.

Therefore, when an external force (P) is applied to bring the protrusion-circumferential portion 11a and the groove-circumferential portion 11b closer, i.e., to reduce the distance between the coupling protrusion 14 and the coupling groove 15, the elliptically shaped circumferential portion 11 becomes circular, and by such shape change, the coupling protrusion 14 is inserted into the coupling groove 15, thereby fixing the cross-sections of the protrusion circumferential portion 11a and the groove circumferential portion 11b together.

Here, a slope surface 14a is formed on one side of the coupling protrusion 14, and another slope surface 15a is formed on one side of the coupling groove 15. When an external force is applied in a direction to reduce the outer diameter of the circumferential portion 11, while the slope surface 14a of the coupling protrusion 14 and the slope surface of the coupling groove 15 meet each other, the coupling protrusion 14 is inserted into the coupling groove 15 so that the divided end surfaces of the circumferential portion 11 are fixed.

That is, a slope surface 14a is formed on one side of the protrusion 14, and another slope surface 15a is formed on one side of the coupling groove 15. When an external force is applied to move the protrusion 14 towards the coupling groove 15, the slope surfaces 14a and 15a come into contact with each other. As the protrusion 14 passes over the slope surface 15a of the coupling groove 15, the coupling protrusion 14 enters the coupling groove 15 due to the elasticity of the coupling protrusion 14, thereby fixing the protrusion circumferential portion 11a and the groove circumferential portion 11b.

In other words, when an external force is applied in a direction to bring the distance between the protrusion 14 and the coupling groove 15 closer, the slope surfaces of the coupling protrusion 14 and the coupling groove 15 come into contact with each other due to the curvature of the circumferential portion 11. In the above state, the slope surface 15a of the coupling groove 15 applies power to push the coupling protrusion 14 outwards based on the circumferential portion 11. Thereafter, when the coupling protrusion 14 is fully moved toward the coupling groove 15, the power to push the coupling protrusion 14 is removed, so the coupling protrusion 14 is completely fit into the coupling groove 15 due to elasticity.

Furthermore, the extension portion 16 includes slits 16d and 16e formed throughout the whole length of the extension portion 16, and slits 16d and 16e are respectively located at the lower portion of the connection part 12 of the circumferential portion 11 and at the lower portion of the coupling protrusion 14.

In other words, the extension portion 16 includes: an upper sloping portion 16a which extends from the circumferential portion 11 and is inclined at a predetermined angle, a lower sloping portion 16c formed to be spaced apart from the upper sloping portion 16a, and a central part 16b located between the upper and lower sloping portions. The angles of the slope surfaces of the upper and lower sloping portions 16a and 16c can vary depending on the sloping angles or shapes of the pipe (P). Two slits 16d and 16e are formed throughout the whole length of the extension portion 16.

In other words, the slits 16d and 16e are formed to divide right and left sides of the extension portion 16. In the illustrated embodiment, the slit 16d is formed at the lower portion of the connection part 12, and another slit 16e is formed at the lower portion of the opposite side of the coupling protrusion 14. Consequently, regardless of the diameter within a certain range, the extension portion 16 can closely fit and be fixed around the pipe (P) to surround the pipe (P).

Furthermore, the coupling portion 17 includes a first coupling plate 17a which is bent at one end surface of the coupling portion 17, an arc coupling plate 18 which is curved in a hemispherical formed at the other end surface of the coupling portion, and a second coupling plate 17b which is bent on the arc coupling plate 18 at a predetermined angle. Bolt holes are respectively formed in the first coupling plate 17a and the second coupling plate 17b, so that the first coupling plate 17a and the second coupling plate 17b can be fixed by fastening bolts 19.

That is, the coupling portion 17 serves to fix the reinforcing cap 10 to the pipe (P) for the safety belt. The first coupling plate 17a is bent at approximately 90° outward from one end of the coupling portion 17, and the arc coupling plate 18 is bent in the hemispherical shape at another end to reduce the inner diameter of the divided portion 17c and enhance the tightness between the reinforcing cap 10 and the pipe (P). The second coupling plate 17b is bent at approximately 90° outward from the arc locking plate 18.

Herein, the bolt holes are respectively formed in each of the first coupling plate 17a and the second coupling plate 17b, so that they can be fixed to each other by the fastening bolts 19. Threads may be formed in the bolt holes in the first coupling plate 17a and the second coupling plate 17b. Alternatively, based on the illustrated embodiment in FIG. 5, threads of dimensions corresponding to the fastening bolts 19 can be formed only in the first coupling plate 17a. Additionally, nuts can be configured as secondary fastening means to fasten the fastening bolts.

Furthermore, the extension portion 16 extends up to the inclined portion (P2) of the pipe for the safety belt, and the coupling portion 17 is fixed and installed on the pipe (P) past the inclined portion (P2).

That is, as described above, the position where the reinforcing cap 10 is fixed by the coupling portion 17 can be adjusted based on the length of the extension portion 16, and by extending the extension portion 16 up to the inclined portion (P2) of the pipe, the explosive force of the explosive device can be prevented from directly affecting the expanded portion (P1) of the pipe.

Figure 9:
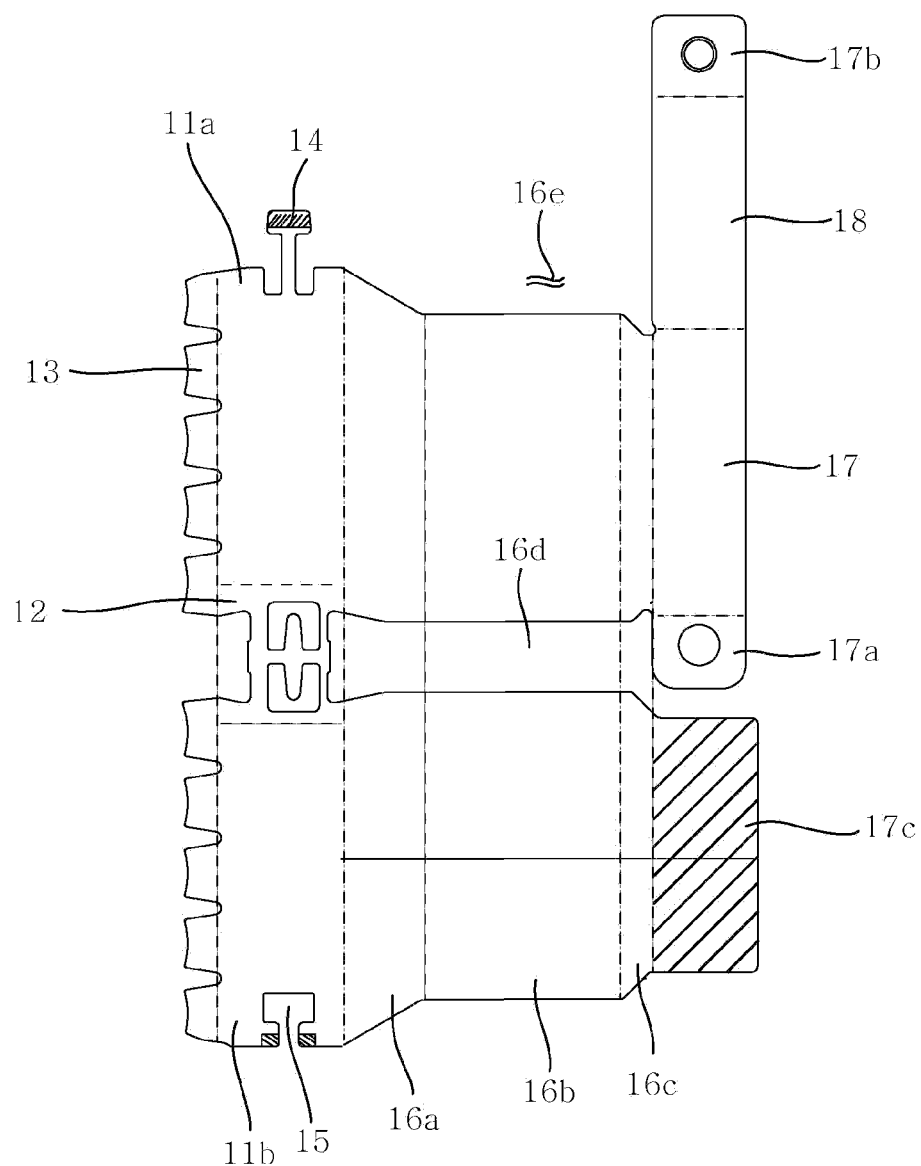
FIG. 9 is a development view of the reinforcing cap according to the present invention.
Figure 10:
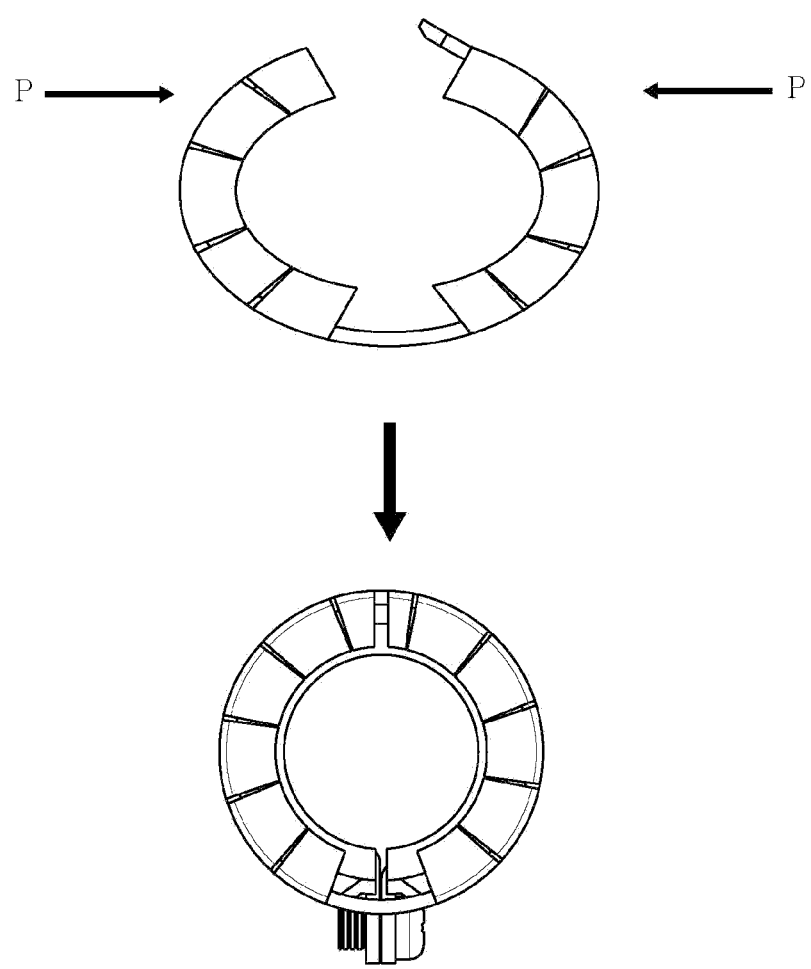
FIG. 10 is an exemplary view of an operational state of the present invention.

FIG. 9 is a development view of the reinforcing cap according to the present invention, and FIG. 10 is an exemplary view of an operational state of the present invention. Using an iron plate of a predetermined thickness, the shape illustrated in FIG. 9 is made. Thereafter, as illustrated in FIG. 10, the circumferential portion 11, the extension portion 16, and the coupling portion 17 are formed in an approximately elliptical shape. Thereafter, to couple to a pipe for a safety belt, the coupling protrusion 14 is fit to the coupling groove 15, the first coupling plate 17a and the second coupling plate 17b come into close contact with each other, and then, are closely fixed by the fastening bolts 19, thereby completing the installation of the reinforcing cap 10.

The dotted lines of FIG. 9 are virtual lines to describe the circumferential portion 11, the connecting part 12, the bending portion 13, the extension portion 16, the coupling portion 17, the arc coupling plate 18, and the first and second coupling plates 17a and 17b. In actuality, the reinforcing cap 10 is made as a single integrated unit from one metal sheet.

In conclusion, the reinforcing cap for a safety belt with enhanced stiffening force is a reinforcing cap for preventing the pipe from being damaged due to the explosion of the explosive device accommodated in the pipe, or for preventing explosive force of the explosive device accommodated in the pipe from being transferred to anything other than the actuating ball accommodated in the pipe due to the explosive device being expelled from the pipe by a closing operation of the pipe, and especially, is fixed at a position past the expanded portion of the pipe, which is relatively low in stiffening force, thereby preventing the expanded portion from being damaged due to the explosive force of an explosion. The reinforcing cap includes the cylindrical circumferential portion, the bending portion formed on one lateral cross-section of the circumferential portion, an extension portion integrally formed with the circumferential portion, and the coupling portion integrally formed with the extension portion, and can be manufactured using one iron plate, thereby simplifying the manufacturing process, reducing manufacturing costs, and facilitating easy installation. In addition, the extension portion extends to an inclined portion of the safety belt pipe, and the coupling portion is securely installed in a position past the inclined portion of the pipe, thereby preventing the explosive force from being directly transferred to the expanded portion of the pipe to prevent damage of the expanded portion.

What is claimed is:

1. A pipe reinforcing cap for a safety belt with enhanced stiffening force to reinforce stiffening force of a pipe used in a safety belt, comprising:
    a cylindrical circumferential portion; a bending portion formed on one lateral cross-section of the circumferential portion; an extension portion integrally formed with the circumferential portion; and a coupling portion integrally formed with the extension portion,
    wherein the coupling portion includes a first coupling plate which is bent at one end surface of the coupling portion, an arc coupling plate which is curved in a hemispherical shape at the other end surface of the coupling portion, a second coupling plate which is bent on the arc coupling plate at a predetermined angle, and bolt holes are respectively formed in the first coupling plate and the second coupling plate, so that the first coupling plate and the second coupling plate can be fixed by fastening bolts, and
    wherein the arc coupling plate is bent in the hemispherical shape at the other end surface to reduce the inner diameter of a divided portion and enhance the tightness between the reinforcing cap and the pipe, and
    wherein the extension portion includes slits formed throughout the whole length of the extension portion, and slits are respectively located at the lower portion of a connection part of the circumferential portion and at the lower portion of a coupling protrusion.

2. The pipe reinforcing cap according to claim 1, wherein the extension portion extends up to an inclined portion of the pipe for the safety belt, and the coupling portion is fixed and installed on the pipe past the inclined portion.

* * * * *